June 6, 1950 F. H. OWENS 2,510,599

SOUND REPRODUCING APPARATUS

Filed Jan. 30, 1946 2 Sheets-Sheet 1

INVENTOR.
Freeman H. Owens
BY
James & Franklin
Attorneys

June 6, 1950 F. H. OWENS 2,510,599

SOUND REPRODUCING APPARATUS

Filed Jan. 30, 1946 2 Sheets-Sheet 2

INVENTOR.
Freeman H. Owens
BY
James & Franklin
Attorneys

Patented June 6, 1950 2,510,599

UNITED STATES PATENT OFFICE 2,510,599

SOUND REPRODUCING APPARATUS

Freeman H. Owens, New York, N. Y.

Application January 30, 1946, Serial No. 644,341

4 Claims. (Cl. 179—100.3)

The present invention relates to a sound reproducing apparatus and more particularly to a novel sound film record having a sound track and an associated control track and a photo-electric cell of novel construction associated therewith.

It is the prime object of the present invention to provide on a sound film record usable in a sound reproducing apparatus a control track adapted, in conjunction with suitable photo-electric apparatus, to control the movement of the film record after the sound track thereon has completed its run. Such a film record is of particular value in connection with the sound reproducing apparatus of my copending application, Serial No. 536,344, filed May 19, 1944, dealing with a coin operated film record sound reproducing apparatus. In such an apparatus, which employs a film record containing a plurality of sound tracks a choice of any one of which may be made by the operator, it is essential to have a means whereby the motion of the film record may be stopped at the end of its playing run, but before the film record has completely unwound from its reel. Should such unwinding take place, the machine would then not be in condition for immediate operation for reproduction either of the same sound track or of any other of the sound tracks carried on the film. If, however, by means of the control track and associated gear herein disclosed, the movement of the sound film can be discontinued upon the termination of reproduction of a given sound track, the apparatus will then be in condition for further reproduction at the will of the operator.

It is an object of the present invention to provide a film record in which the sound tracks and their associated control tracks are so positioned thereon that neither interferes with the other and that each functions independently of the other.

It is still another object of the present invention to provide, in conjunction with a film record having such a sound track and control track, a multiple element photo-electric cell, at least one element of which is adapted to receive light transmitted through the sound track of the film record and to control a sound reproducing circuit in accordance therewith, and at least another element of which is adapted to receive light transmitted through the control track and to actuate a second circuit which functions to control the movement of the film record.

It is still another object of the present invention to provide a photo-electric cell of the type described, in which the light sensitive elements are adapted to receive light from a plurality of sound tracks and control tracks and between which photo-electric cell and sound tracks is interposed a means for selectively determining the sound track, reproduction of which is to be accomplished.

It is yet another object of the present invention to provide in a photo-electric cell of the type described such a relative positioning of the light sensitive elements and the light admitting means that the light which passes through each sound track is directed to a particular light sensitive element or elements and the light passing through the control track is directed to a separate light sensitive element or elements.

To the accomplishment of the foregoing objects, and such other objects as may hereinafter appear, my invention relates to the film record, photo-electric cell, and sound reproducing apparatus, as sought to be defined in the appended claims, and as described in the following specification taken together with the accompanying drawings, in which:

Referring now more in detail to the drawings, my invention, generically described, comprises a film record generally designated as A, on which is impressed, as by photographic means, one or more sound tracks generally designated B, and associated therewith one or more control tracks generally designated C (see Figs. 5 and 6), each control track commencing where the sound track ends and being positioned to one side of said sound track. A light transmission system generally represented in Fig. 1 and described more in detail hereinafter, is adapted to pass light through the sound tracks B and control tracks C to a photo-electric cell generally designated as D. The elements of the cell are enveloped at least in part by an opaque medium E, having disposed thereon slits F and openings G, so arranged with respect to light sensitive elements H, I, and I' disposed within the photo-electric cell D, that light passing through the sound track B travels via the slit F to the light sensitive element H, and light passing through the control track C travels via the openings G to the light sensitive elements I, I'. The light sensitive element H is connected to and electrically controls the operation of a first circuit J (see Fig. 7) for operating a sound reproducer; and light sensitive elements I, I' are electrically connected to and control a second circuit K which is designed to function when the sound track B has completed its run.

*General arrangement*

In order clearly to understand the function and operation of the structure of my present invention, an apparatus in which it may be used to particular advantage may first be briefly described.

Figures 1, 7:
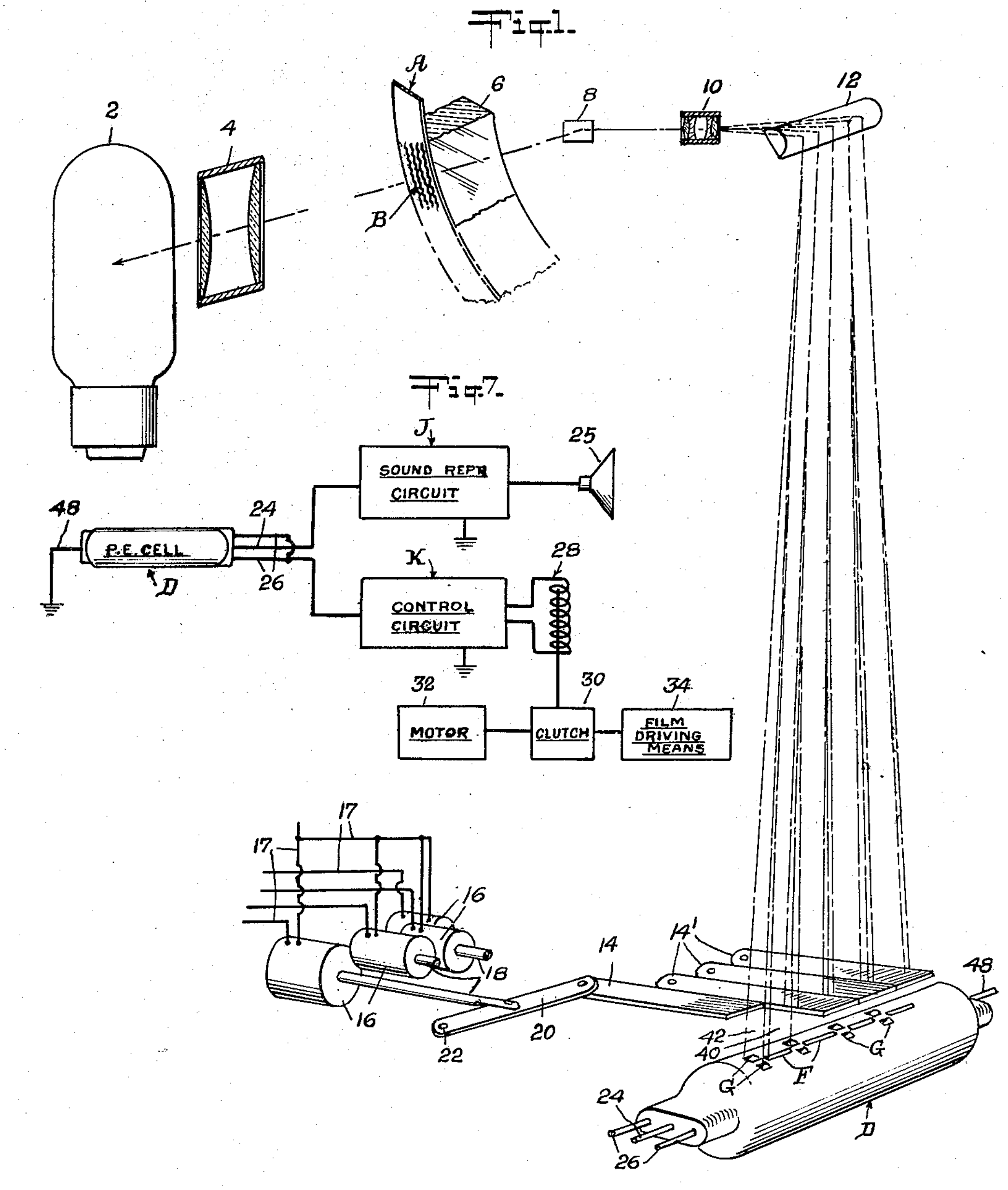
Fig. 1 is a schematic representation of the arrangement of the optical system in one embodiment of my invention.
Fig. 7 is a block diagram of the functional arrangement of the units of an entire sound reproducing apparatus.

This apparatus in part comprises an optical system depicted in Fig. 1, which may consist of an illuminating lamp 2, the light from which is passed through a condensing lens 4 and thence through a film record A which carries thereon a plurality of sound tracks B. This film record A may be driven by a transparent annulus 6, through which the light will pass on its way through a prism 8, a projection lens 10, and another reflecting prism 12 to the photo-electric cell D.

Between the reflecting prism 12 and the photo-electric cell D are disposed a plurality of slidable shutters 14, 14' (here four in number), each of which when in its retracted position (illustrated by shutter 14) exposes one set of slits F and openings G to, and when in its extended position, (illustrated by any of shutters 14') shields said set from, the light transmitted from reflector 12. Each shutter may be selectively retracted by a solenoid 16, acting through rods 18 and links 20 which are pivoted at 22. A separate solenoid-linkage assembly is provided for each shutter. Thus through appropriate control solenoid circuits 17, 17, one for each solenoid, the particular sound track reproduction which is desired may be selected from a remote station.

The centrally disposed light sensitive element H of the cell D to which is directed the light which has passed through the sound track B is connected to the cell terminal 24 which is in turn connected to the sound reproducing circuit J controlling the output of one or more loud speakers 25. The intensity of the light passing through the sound track B and impinging upon the light sensitive element H is modulated according to the sound to be reproduced, and the sound reproducing circuit J transforms that modulation into audible sound emanating from the loud speaker 25. As can be seen, light from the lamp 2 always impinges upon the control track area of the film record A. However, as will be later set forth more in detail, since that area is opaque over that portion of the film record A which carries the sound track B, (the transparent portions C of the control track not commencing until the end of the sound track B) no light is transmitted therethrough during the time that the sound track B is controlling the sound reproducing circuit J. When the run of the sound track has been completed, however, the transparent portion C of the control track permits light to pass therethrough, and this light is directed with its intensity unmodulated through the openings G to the light sensitive elements I, I'. These light sensitive elements are connected to terminals 26, which are in turn connected to the second or control circuit K. In the embodiment here illustrated, control circuit K, when triggered by the output from light sensitive elements I, I', actuates a solenoid 28, which in turn disconnects clutch 30 disposed between motor 32 and film driving means 34. Thus when the sound track has completed its run, the motor is disconnected from the film driving means and the film A will no longer move past the lamp 2 and lens 4. The motor is, however, left running, and should a subsequent sound reproduction be desired all that is needed is to reconnect the clutch by any suitable means. It is to be understood, of course, that the clutch is of a reversible type so that the film record may be driven in either direction.

It is also to be understood that my invention is not confined to the specific control function here disclosed. If desired, the solenoid could actuate a switch disconnecting the motor from its source of power, thus stopping it, or the solenoid might actuate a switch for the sound reproducing circuit J, thus discontinuing its operation. In other words, the control circuit might perform any function the occurrence of which is desired at the time the sound track completes its run.

*Film record arrangement*

Figures 2, 3, 4, 5, 6:
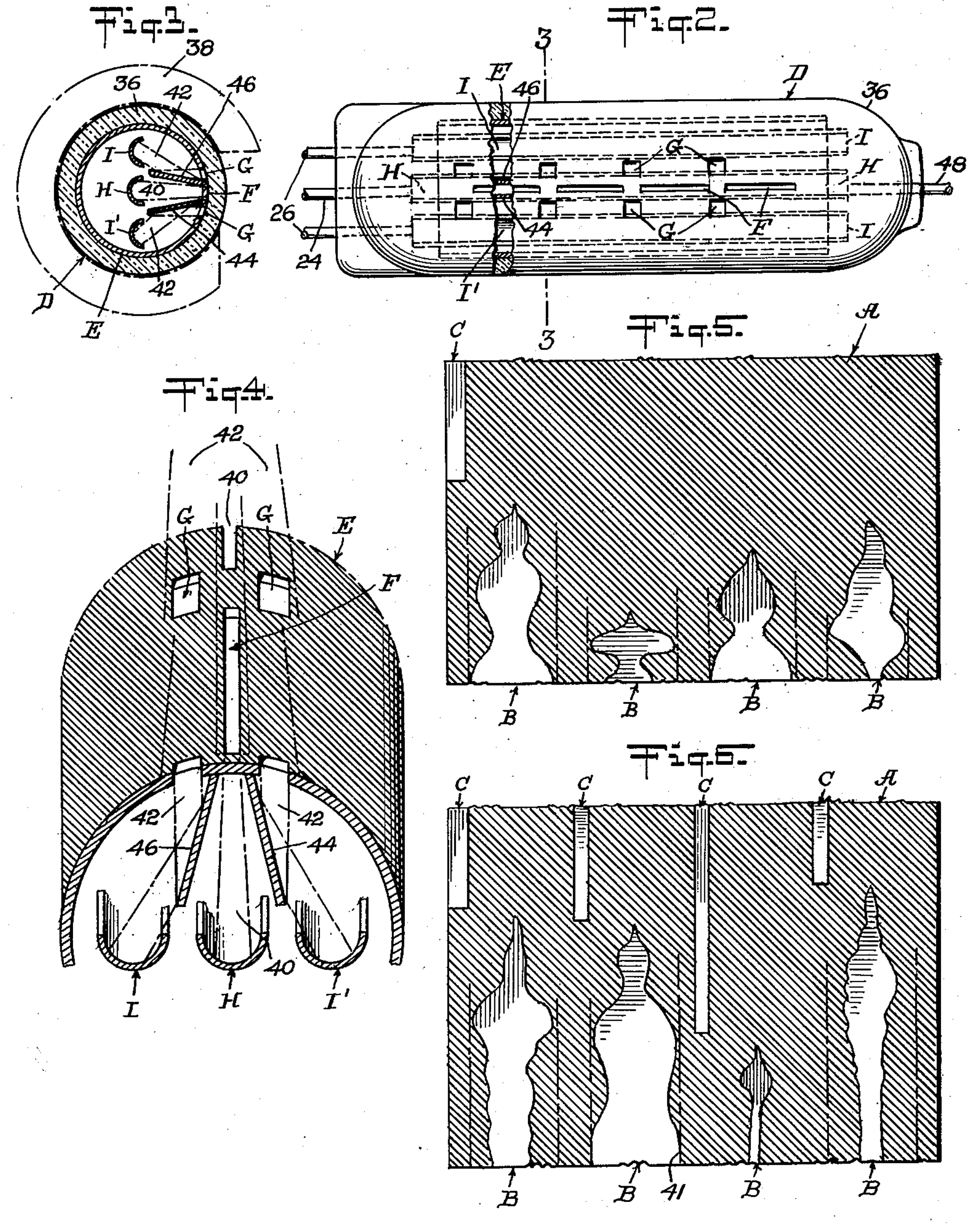
Fig. 2 is a top view partly cut away, of the photo-electric cell of my invention.
Fig. 3 is a cross-sectional view taken along the lines 3—3 of Fig. 2, with the holder for the photo-electric cell indicated in broken lines.
Fig. 4 is a fragmentary perspective view drawn to an enlarged scale of the active parts of the photo-electric cell of Fig. 2.
Fig. 5 is one embodiment of a sound track according to the present invention.
Fig. 6 is another embodiment thereof.

Two embodiments of the film record of my invention are shown in Figs. 5 and 6. The sprocket holes for this film record are not shown, since they form no part of the present invention and function solely in conventional manner as guiding and driving means therefor.

On the film record are disposed side by side one or more sound tracks B. In the embodiment of Fig. 5 a single control track C is employed, disposed to one side of the sound tracks B and commencing after all of those sound tracks have ended. In the embodiment of Fig. 6 a plurality of sound tracks B are provided, each with an associated control track C. Each of these control tracks C commences where its associated sound track B ends and is positioned to one side thereof so as not to interfere therewith, the sets of associated sound and control tracks B and C being positioned one beside the other in non-overlapping manner so that, for example, the third control track C from the left in Fig. 6 will not interfere with the reproduction of sound derived from the second sound track B from the left of Fig. 6. Thus when the film of Fig. 5 is employed, the motor 32 will be disconnected from the film driving means 34 after the film has passed through the sound reproducing apparatus to such an extent that the longest sound track on that film has completed its run. With the film record of Fig. 6 the de-clutching operation will take place as soon as the particular sound track being reproduced has completed its run irrespective of the position of the other sound tracks on the film record.

*Photo-electric cell*

The photo-electric cell of the present invention as herein disclosed comprises a glass envelope 36 supported in a suitable holder 38 (shown in broken lines in Fig. 3), interiorly disposed in which is an opaque medium E which may consist of a dye-impregnated cellophane in which transparent slits F and rectangular openings G may be photographically formed. Longitudinally disposed within the photo-electric cell D are the plurality of light sensitive elements H, I, and I'.

Element H is centrally disposed directly beneath the longitudinal slits F so that light rays 40 which have passed through the sound track B will pass through the slit F and impinge upon it. Since the intensity of the light ray 40 is modulated by the sound track B in accordance with the sound to be reproduced, the electrical output from the light sensitive element H will be proportional thereto and will accordingly control the sound reproducing circuit J so as to cause the loud speaker 25 to produce sound of the desired amplitude and frequency.

It will be noted that there are as many longitudinal slits F as there are sound tracks B on the film record A. The length of each of these slits F is determined by the optical characteristics of the system shown in Fig. 1 in such a manner that the light rays 40 which pass through each sound track B when that sound track is at its maximum width (see point 41 of Fig. 6) will completely fill the length of the slit F. The width of the slits F are determined by the speed of travel of the film record A and the sound definition required, in the manner well known in the art. Longitudinal spacing between the slits F is similarly determined by the optical characteristics of the optical system shown in Fig. 1, in correspondence to the width of the control track portion C and the light rays 42 passing therethrough.

In the spaces between the slits F, and disposed on either side thereof, are the rectangular openings G. The light rays 42 which pass through the control track areas C of the film record A will impinge upon the opaque medium E at the spaces between the slits F, and will be transmitted therethrough via the openings G. The width of these rays 42 when they reach the opaque medium E will determine the size of the openings G and the longitudinal spacing between the slits F. Said light rays 42 are reflected by means of partitions 44 and 46 to the two outer light sensitive elements I, I'. As best shown in Fig. 7, said two light sensitive elements I and I' are connected in parallel to the control circuit K. Hence when the transparent portion of the control track C passes before the lamp 2 and lens 4, light will be transmitted therethrough to light sensitive elements I, I', which will in turn develop an electrical output and trigger-control circuit K, causing it to perform its designed function.

For convenience of manufacture, the partitions 44 and 46 may also function as cathodes for the photo-electric cell D, being connected to terminal 48 and thence to ground. The sound reproducing circuit J and the control circuit K may also be appropriately grounded in order to complete the circuits (see Fig. 7).

*Operation*

As will be apparent from the foregoing description, as the film record A moves over the transparent drive disc 6 in sound reproducing position light from the lamp 2 passes through all of the sound tracks B carried by the film record A (here shown as 4 in number), and is thence directed to the photo-electric cell D. By means of the shutters 14, 14', and their solenoid control, light from only a single sound track is permitted to reach the photo-electric cell D, and that light is transmitted via the appropriate slit F to the light sensitive element H, the electrical output of which is dependent upon the intensity of that light. The electrical output from element H controls, by means of terminal 24, the electrical output of the sound reproducing circuit J and loud speaker 25. When the sound track being reproduced has completed its run (in the case of the sound track of Fig. 6), light is no longer transmitted through the sound track portion of the film record A, and hence the electrical output of element H and sound reproduction by circuit J cease. At that time, however, light is transmitted through the control track C associated with the sound track B which was being reproduced. This light is directed via the appropriate openings G and reflecting partitions 44 and 46 to light sensitive elements I and I'. When this light thus impinges upon these elements they develop an electrical output which is transmitted by terminals 26 to control circuit K. When control circuit K is thus triggered the apparatus associated therewith performs its designed function, here shown as declutching the motor 32 and film driving means 34 so that rotation of the film record A will cease.

The apparatus as here disclosed is specifically designed for a sound track of a type shown in Fig. 6. Should the sound track of Fig. 5 be employed, only one set of rectangular openings G need be provided in the opaque medium E. They would be positioned at that end of the photo-electric cell D upon which the light 42 passing through the single control track C would impinge. The shutters 14 would be so designed as to selectively block and expose the slits F, but no shutter would interpose between the openings G and the reflector 12 so as to block the light rays 42.

While I have described my invention in a preferred form, it will be apparent that changes may be made therein without departing from the spirit of the invention, as defined in the following claims.

I claim:

1. In a sound reproducing apparatus, in combination, a film record having a plurality of sound tracks and, at a given end of said film, a plurality of control tracks each associated with a different sound track, each control track commencing where its associated sound track ends and being positioned to one side of said track, the sets of associated sound and control tracks being positioned one beside the other in non-overlapping manner, a photo-electric cell comprising at least two light sensitive elements, an opaque medium between said film record and said light sensitive elements, said medium being provided with a plurality of sets of transparent slits and transparent openings, the openings in each set being positioned beside said slit and at an end thereof, each of said sets being disposed in non-overlapping position along said opaque medium, the slits and openings being so positioned with respect to the light sensitive elements that a light beam passing through the sound tracks is directed via the slits to one of said light sensitive elements and a light beam passing through the control tracks is directed via the openings to the other light sensitive element, both of said beams travelling in the same plane, means for selecting a sound track and associated control track, a first circuit for operating a sound reproducer, a second circuit to operate means to discontinue the operation of said apparatus, the said one of said light sensitive elements being connected to control said first circuit, and the other of said light sensitive elements being connected to control said second circuit.

2. In a sound reproducing apparatus, in combination, a film record having a sound track and, at a given end of said film, a control track, the control track commencing where the sound track ends and being positioned to one side of the sound track, a photo-electric cell comprising three light sensitive elements disposed one beside the other longitudinally of said photo-electric cell, an opaque medium between said film record and said light sensitive elements, said medium being provided with a transparent slit and two transparent openings on either side of and beyond an end of said slit, said slit and said openings being so positioned with respect to said light sensitive elements that the light passing through the sound track is directed via the slit to the central one of said light sensitive elements, and the light passing through the control track is directed via the two openings to the outer two light sensitive elements, a first circuit for operating a sound reproducer, a second circuit to operate means to discontinue the operation of said apparatus, the central one of said light sensitive elements being connected to control said first circuit, and the outer two of said light sensitive elements being connected to control said second circuit.

3. In a sound reproducing apparatus, in combination, a film record having a plurality of sound tracks and, at a given end of said film, a plurality of control tracks each associated with a different sound track, each control track starting where its associated sound track ends and being positioned to one side of said sound track, the sets of associated sound and control tracks being positioned upon the film one beside the other in non-overlapping manner, a photo-electric cell comprising three light sensitive elements disposed side by side longitudinally of said photo-electric cell, an opaque medium between said film record and said light sensitive elements, said medium being provided with a plurality of transparent slits in line one with the other longitudinally of said photo-electric cell, two transparent openings associated with each slit and disposed one to each side thereof and beyond the ends thereof, said transparent slits and openings being so positioned with respect to said light sensitive elements that the light passing through the sound tracks is directed via the slits to the central one of said light sensitive elements, and the light passing through the control tracks is directed via the openings to the outer two light sensitive elements, means for selecting a sound track and associated control track, a first circuit for operating a sound reproducer, a second circuit to operate means to discontinue the operation of said apparatus, the central one of said light sensitive elements being connected to control said first circuit, and the outer two of said light sensitive elements being connected to control said second circuit.

4. In a sound reproducing apparatus, in combination, a film record having a plurality of sound tracks and, at a given end of said film, a plurality of control tracks each associated with a different sound track, each control track commencing where its associated sound track ends and being positioned to one side of said sound track, the sets of associated sound and control tracks being positioned one beside the other on the film in non-overlapping manner, means for selecting a sound track and associated control track, a photo-electric cell having at least two spaced light sensitive elements and a light transmissive system for directing light which has passed through the film record sound tracks to one of said light sensitive elements in the photo-electric cell and for directing light which has passed through the film record control tracks to the other light sensitive elements in the photo-electric cell.

FREEMAN H. OWENS.

REFERENCES CITED

The following references are of record in the file of this patent:

UNITED STATES PATENTS

| Number | Name | Date |
|---|---|---|
| 1,880,240 | Czeija et al. | Oct. 4, 1932 |
| 1,950,011 | Scheibel | Mar. 6, 1934 |
| 2,069,631 | Thomas | Feb. 2, 1937 |
| 2,166,672 | Baker | July 18, 1939 |
| 2,207,249 | Goldsmith | July 9, 1940 |
| 2,238,733 | Hullegard | Apr. 15, 1941 |
| 2,254,478 | Fodor | Sept. 2, 1941 |
| 2,287,965 | Borberg | June 30, 1942 |
| 2,314,382 | Batsel | Mar. 23, 1943 |

FOREIGN PATENTS

| Number | Country | Date |
|---|---|---|
| 435,326 | Germany | Oct. 12, 1926 |